United States Patent

[11] 3,601,833

[72] Inventor Shigeo Takeuchi
 Nagoya, Japan
[21] Appl. No. 873,979
[22] Filed Nov. 4, 1969
[45] Patented Aug. 31, 1971
[73] Assignee Takeuchi Tekko Kabushiki Kaisha
 Nagoya, Japan
[32] Priority June 9, 1969
[33] Japan
[31] 44/44673

[54] OPERATION CONTROL DEVICE FOR SIDE BRUSHES OF AUTOMATIC CARWASHING APPARATUS
1 Claim, 7 Drawing Figs.
[52] U.S. Cl. .................................................. 15/21E, 15/53
[51] Int. Cl. .................................................. B60s 3/06
[50] Field of Search .......................................... 15/21 R, 21 D, 21 E, DIG. 2, 97, 302, 53

[56] References Cited
FOREIGN PATENTS

| | | | |
|---|---|---|---|
| 1,457,311 | 9/1966 | France | 15/DIG. 2 |
| 1,523,276 | 3/1968 | France | 15/DIG. 2 |
| 1,532,722 | 6/1968 | France | 15/DIG. 2 |

Primary Examiner—Edward L. Roberts
Attorney—Karl W. Flocks

ABSTRACT: Two pairs of guide rails are mounted on a travelling frame of a carwashing apparatus and a truck is mounted on each pair of the guide rails for movement thereon. A supporting shaft from which a side brush is swingably suspended is rotatably supported by each truck and two cam discs are fixedly mounted on the supporting shaft for selectively actuating sensing members provided on each truck, according to the angle of inclination of the side brush, and thereby for controlling a prime mover for operating the trucks or the traveling frame.

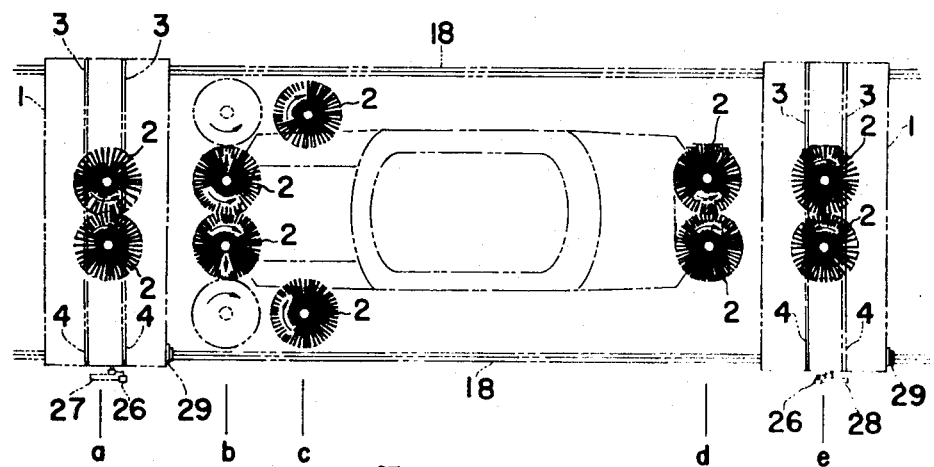
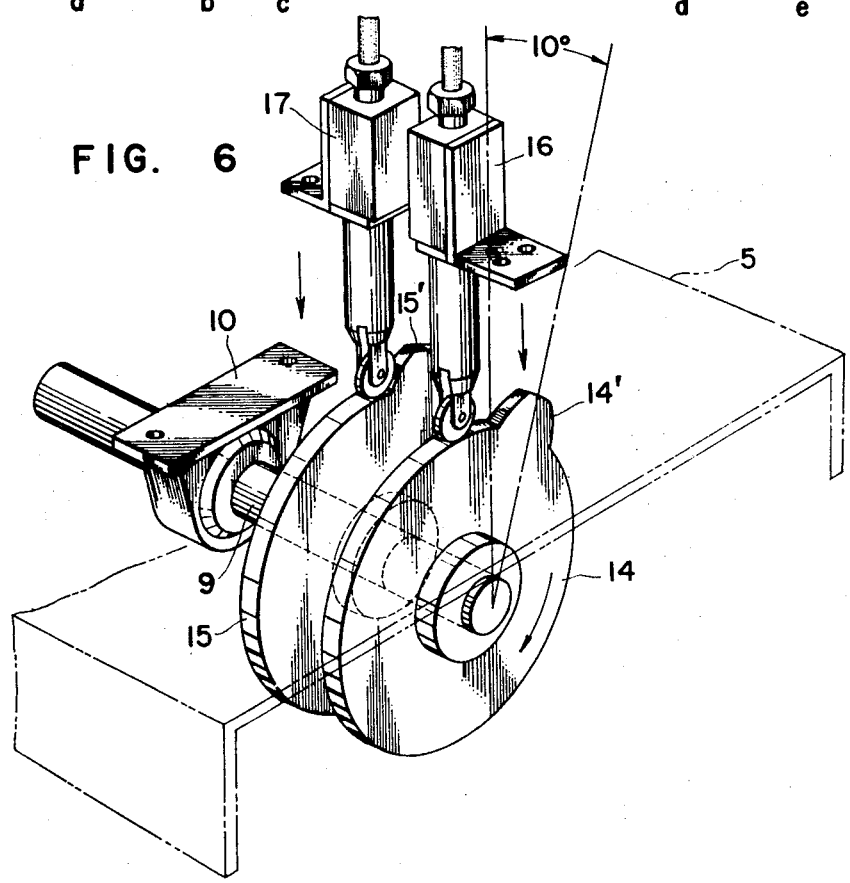

OPERATION CONTROL DEVICE FOR SIDE BRUSHES OF AUTOMATIC CARWASHING APPARATUS

BACKGROUND OF THE INVENTION

1. Field of the Invention

The present invention relates to an operation control device for the side brushes of an automatic carwashing apparatus, by which a pair of side brushes supported by the frame structure of the automatic carwashing apparatus can smoothly be opened or closed to constantly follow the contour of the vehicle body while rotating in contact with said vehicle body, whereby the surface of the vehicle body is washed in an efficient manner.

2. Description of the Prior Art

In a carwashing apparatus having a pair of side brushes movably connected to the opposite sidewalls of a travelling frame structure, a brush-operating device by which the side brushes are brought into contact with the surfaces of a vehicle body for brushing and washing the same, has been known. With this type of device, since the side brushes are supported by pivotable levers or the like, it has been impossible to keep the rotating brushes in contact with the variable size of a vehicle body while constantly following the contour of the vehicle body, and the surface of the vehicle body could not always be washed completely, depending upon the type of the vehicle.

SUMMARY OF THE INVENTION

It is, therefore, the object of the present invention to provide an operation control device for the side brushes of an automatic carwashing apparatus, by which a pair of rotating side brushes, suspended from the frame structure of the carwashing apparatus, are moved in contact with the surface of a vehicle body while following the contour of the vehicle body, whereby the surface of the vehicle body is washed completely, quickly and smoothly.

A preferred embodiment of the operation control device according to the present invention will be described hereunder with reference to the accompanying drawings:

BRIEF DESCRIPTION OF THE DRAWINGS

FIGS. 4 to 6 are enlarged perspective views respectively, showing the operation of an operation control unit for the side brushes; and FIG. 7 is a plan view showing the process of a carwashing operation using the device of the invention.

DESCRIPTION OF THE PREFERRED EMBODIMENT

Figure 1:
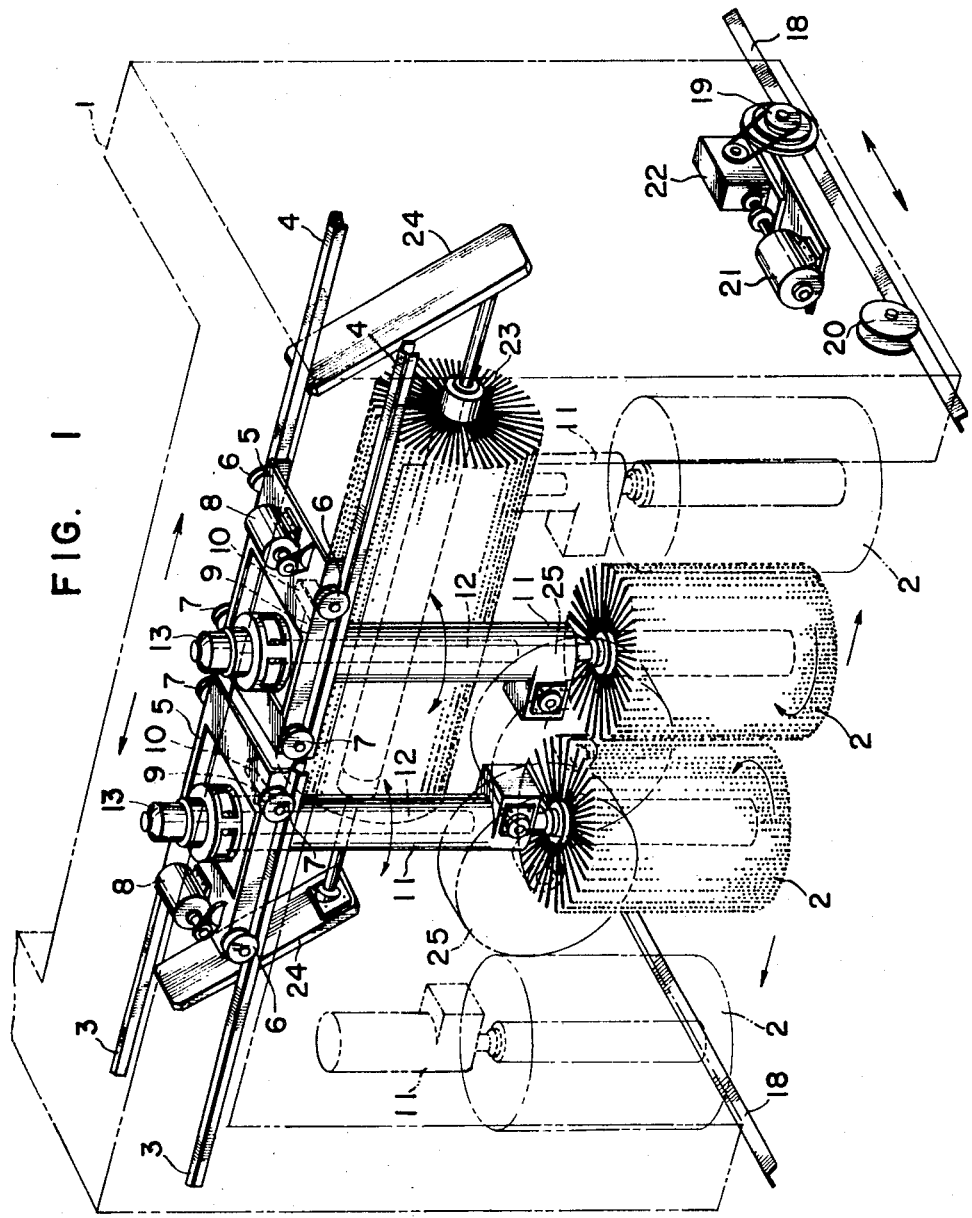
FIG. 1 is a perspective view of an automatic carwashing apparatus which is provided with the side brush operation control device of this invention.
Figures 2, 3:
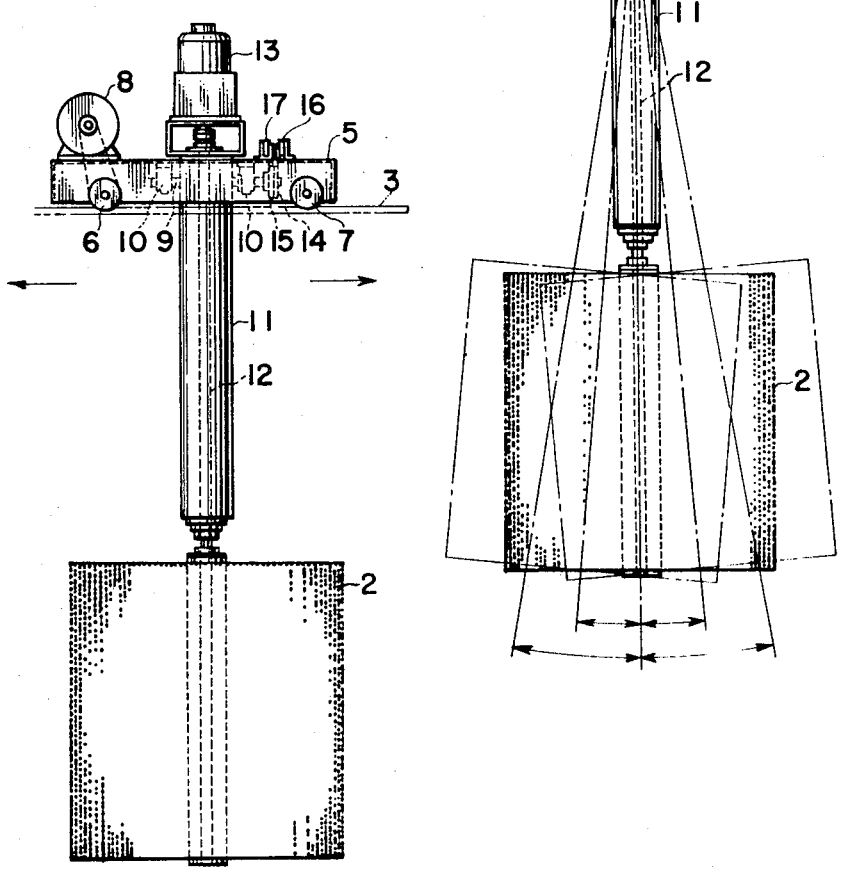
FIG. 2 is a front view of a side brush supporting structure.
FIG. 3 is a side view of the side brush supporting structure shown in FIG. 2.
Figure 4:
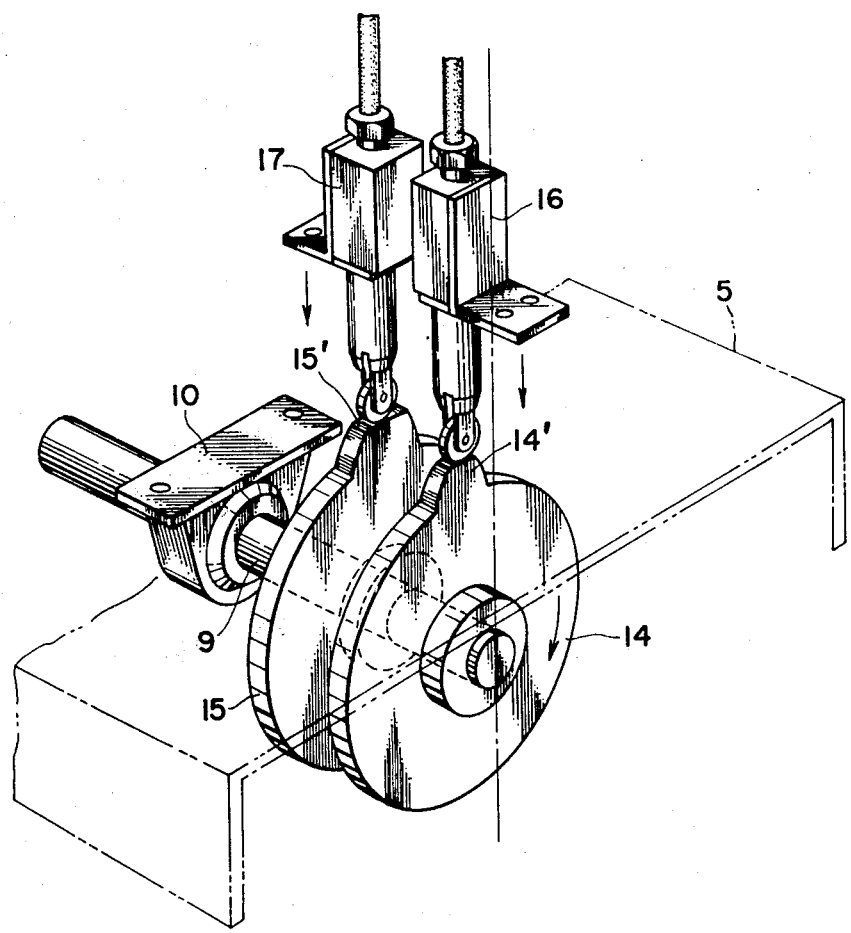

A pair of side brushes 2, 2 are supported at each end of an arch-shaped travelling frame 1, by a supporting mechanism which will be described in detail hereinafter.

Two pairs of guide rails 3, 3 and 4, 4 are mounted on a ceiling of the travelling frame 1 at right angles to the opposite sidewalls of said frame in such a manner that the confronting guide rails 3, 4 are declined towards the inner ends thereof. On each pair of the guide rails 3, 3 or 4, 4 is mounted a truck 5 for travelling thereon, with driving wheels 6, 6 and driven wheels 7, 7 resting on said respective rails. The driving wheels 6, 6 are driven from a prime mover 8 mounted on the truck 5. A supporting shaft 9 is rotatably supported by brackets 10, 10 on the underside of each truck 5, and a supporting column 11 is suspended from the supporting shaft 9. Thus, it will be seen that the supporting column 11 is swingable, together with the supporting shaft 9, in a direction at right angles to the travelling direction of the truck 5. Extending through the supporting column 11 is a drive shaft 12 which is connected to a prime mover 13 at its top end and has the aforesaid side brush 2 mounted on the lower end thereof. The side brush 2 is rotatable around the vertical axis thereof by the drive of the prime mover 13.

As shown in FIGS. 3 to 6, the supporting shaft 9 has fixedly mounted thereon a cam disc 14 having a narrow cam lobe and a cam disc 15 having a wide cam lobe 15'. On the other hand, the truck 5 has fixedly mounted thereon sensing members, e.g. limit switches 16, 17, for engagement with the respective cam discs 14, 15. These limit switches 16, 17 are actuated by the cam discs 14, 15 when said cam discs are rotated incident to a swinging movement of said respective side brushes 2. The limit switch 16 is to control the prime mover 8 for operating the truck 5 and a prime mover 21 for operating the travelling frame 1, which will be described later. The limit switch 17 is to control the prime mover 21 for operating the travelling frame 1.

At the bottom of each sidewall of the arch-shaped travelling frame 1 are provided a driving wheel 19 and a roller 20 for rolling on a rail 18. The driving wheel 19 is driven from a prime mover 21 through a reduction gearing 22. Thus, it will be seen that the travelling frame 1 can be reciprocated on the rails 18, 18 by controlling the prime movers 21.

In FIG. 1, numeral 23 designates a top rotary brush which is supported by a pair of supporting arms 24, 24 pivotably connected to the upper portion of the travelling frame 1, and by which the top surface of a vehicle body is washed. Numerals 25, 25 designate window brushes, respectively supported on the aforesaid supporting columns 11 and operated from the drive shafts 12 extending through said respective supporting columns. Numeral 26 in FIG. 7 designates a limit switch for controlling the travelling of the travelling frame 1 and the rotation of the rotary brushes; numeral 27, 28 designate limit switch operating members; and numeral 29 designates a pushbutton.

Next, the carwashing operation of the apparatus constructed as described above, will be explained hereunder: A vehicle, e.g. an automotive vehicle, to be washed is held stationary at the center between the rails 18, 18 and the pushbutton 29 located at the left end of the travelling frame 1 is depressed, whereupon the side brushes 2, 2 are driven in the directions of the arrows shown in FIG. 7 and at the same time the travelling frame 1 starts to move from the front side to the rear side of the vehicle while travelling on the rails 18, 18 (as indicated by a in FIG. 7). The side brushes 2, 2 are brought into contact with the front bumper of the vehicle and the drive shafts 12 of the respective brushes are inclined at a predetermined angle (about 5°) to the supporting shafts 9, integrally with said supporting shafts. The pair of cam discs 14, 15 are rotated from the positions shown in FIG. 4 to the positions shown in FIG. 5 respectively and thus the narrow cam lobe 14' is disengaged from the contacting end of the limit switch 16. The limit switch 16 is actuated and causes the travelling frame 1 to stop moving. At the same time, the prime mover 8 is set in operation and the pair of trucks 5, 5 are caused to travel outwardly on the rails 3, 3 and 4, 4 respectively. As a result, the side brushes 2, 2 are moved outwardly while rotating in contact with the front surface of the vehicle (as indicated by b in FIG. 7), and thereby the front surface of the vehicle, including the front grill, are washed by brushing.

Figure 5:
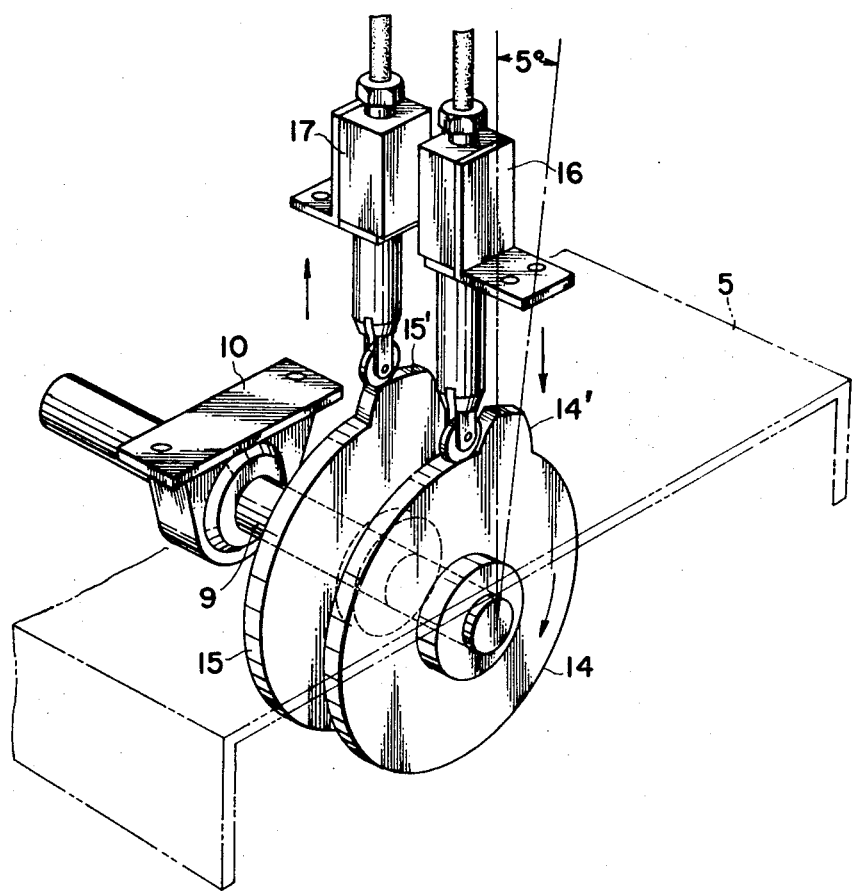

If the brushes, 2, 2 are further tilted (about 10°) (as indicated by the one-dot chain line in FIG. 7), in the process of washing the front surface of the vehicle described above, due to collision against a projection of the vehicle body, the pair of cam discs 14, 15 will be further rotated from the positions shown in FIG. 5 to the positions shown in FIG. 6. Therefore, the contacting end of the limit switch 17 will also be disengaged from the wide cam lobe 15' of the cam disc 15 and hence the limit switch 17 will also be actuated. As a result, the rotation of the prime mover 21 is reversed and the travelling frame 1 is slightly moved backward from the stationary position, carrying the side brushes 2, 2 away from the surface of the vehicle body, whereby the side brushes 2, 2 are prevented from being caught by the vehicle body.

As the angle of inclination of the side brush 2 decreases, the pair of cam discs 14, 15 return to the positions shown in FIG. 5 from the positions shown in FIG. 6, so that the limit switch 17 is deenergized and the operation of brushing and washing the front surface of the vehicle body can be continued.

When the trucks 5, 5 have moved away from the front side of the vehicle body upon completion of their outward movement, the side brushes 2, 2 resume a vertical position. Accordingly, the pair of cam discs 14, 15 also return from the positions shown in FIG. 5 to the positions shown in FIG. 4 and the limit switch 16 is deenergized. The prime mover 8 is deenergized and at the same time the prime mover 21 is energized. Since the guide rails 3, 3 and 4, 4 are declined toward the inner ends thereof, the trucks 5, 5 begin to move inward under their own weights and at the same time the travelling frame 1 starts to move again. Thus, the pair of side brushes 2, 2 are brought into contact with the side surfaces of the vehicle body (as indicated by $c$ in FIG. 7) while rotating, and brush said surfaces of the vehicle body respectively.

As the travelling frame 1 continues to travel and the pair of side brushes 2, 2 are moved off the side surfaces of the vehicle body, the trucks 5, 5 travel inwardly under their own weights and stop at their inward positions (as indicated by $d$ in FIG. 7).

When the travelling frame 1 has reached the terminal end of its stroke (as indicated by $e$ in FIG. 7), the limit switch 26 abuts against the operating member 28 to be switched thereby. Therefore, the travelling frame 1 moves backward and at the same time the rotation of the side brushes 2, 2 are reversed. As the travelling frame 1 moves from the rear side to the front side of the vehicle body on its backward stroke, the side brushes 2, 2 are brought into contact with the rear surface of the vehicle body. Thus, the cam disc 15 or 16 is rotated to actuate the limit switch 16 or 17 and the side brushes brush the rear surface of the vehicle body, including the rear bumper and the rear trunk, again brush the side surfaces of the vehicle body and return to the original position (as indicated by $a$ in FIG. 7), while being controlled in the same manner as described above. When the travelling frame has reached the terminal end of its backward stroke, the limit switch 26 is actuated by the operating member 27, so that the travelling frame 1 stops travelling and the side brushes 2, 2 stop rotating. By this step, the entire washing operation has been accomplished.

As described above, according to the present invention the travelling of the side brushes, which are swingably suspended from the respective trucks, can be controlled by the angle of inclination of said brushes. Therefore, it is possible to operate the side brushes following the contour of the vehicle body, while rotating them in pressure contact with the vehicle body, and to brush the surfaces of the vehicle body smoothly quickly. Even when the side brush is caught by a projection of the vehicle body or the like, the brush is automatically released from the vehicle body, so that there is no danger of the surface of the vehicle body or the side brush being damaged.

I claim:

1. An operation control device for the side brushes of an automatic carwashing apparatus, comprising a travelling frame extending over the path of a car in a plane transverse to the car and adapted for longitudinal displacement along said car, two pairs of guide rails mounted on said travelling frame and extending in the plane transverse to the car with one of said pairs of rails positioned on each side of the center of the car path, a pair of trucks mounted on said respective pairs of guide rails for movement thereon, a supporting shaft rotatably supported by each of said trucks and having a side brush swingably suspended therefrom, two cam discs fixedly mounted on said supporting shaft and two sensing members provided on each of said trucks and held in engagement with said respective cam discs, said cam discs being selectively actuated according to the angle of inclination of the associated side brush, whereby a prime mover for operating said trucks or said travelling frame is controlled.